INVENTOR
J. J. KIRKLAND,
BY Alvin S. Bass
AGENT

United States Patent Office 3,505,785
Patented Apr. 14, 1970

3,505,785
SUPERFICIALLY POROUS SUPPORTS FOR CHROMATOGRAPHY
Joseph J. Kirkland, Wilmington, Del., assignor to E. I. du Pont de Nemours and Company, Wilmington, Del., a corporation of Delaware
Filed June 20, 1967, Ser. No. 647,506
Int. Cl. B01d *15/08*
U.S. Cl. 55—67          8 Claims

ABSTRACT OF THE DISCLOSURE

This invention relates to an improvement in chromatography and chromatographic columns. A novel packing of superficially porous refractory particles for use in chromatography has been prepared consisting of a plurality of discrete macroparticles with impervious cores and having irreversibly joined thereto a coating of a series of sequentially adsorbed like monolayers of like colloidal inorganic microparticles. The coating is characterized by being uniform and of predetermined thickness. In preferred embodiments, the cores would be ceramics, preferably glass spheres, and the coating would consist of monolayers of colloidal refractory particles, preferably silica, in a structure of predetermined thickness and porosity.

BACKGROUND OF THE INVENTION

This invention relates to chromatography. In a chromatographic process, it is customary to pass a mixture of the components to be resolved in a carrier fluid through a chromatographic apparatus or separative zone. The separative or resolving zone generally consists of a material which has an active chromatographic sorptive function.

The chromatographic apparatus generally employed are columns. These are open tubes which have been packed with a granular material. For analytical work, the columns are usually of small internal diameter in the millimetric range. They are of larger diameter for preparative chromatography. Commonly employed support materials are granules having sorptively active surfaces or surfaces which have been coated with a substance which is sorptively active. Passing the mixture to be separated through the column results in repeated interactions associated with the chemical nature of the different components and the chromatographically-active surfaces. Different compounds will have different retention times on the column due to these repeated interactions. The column eluent is generally passed through an analyzer, for example a flame ionization detector, to determine when the resolved components emerge from the column and to permit the measurement of the retention times and amounts of each.

It has long been recognized that ideal chromatographic supports would consist of a plurality of discrete particles of perfectly regular shape, preferably spheres, having surfaces with a large number of superfiicial shallow pores and no deep pores. In order for different columns to give reproducible chromatographic results, the support granules should be regular and their surface characteristics readily controllable and reproducible. This has been very difficult to realize in practice.

British Patent #1,016,635 discloses a chromatographic support made by coating a particulate refractory solid on an impermeable core. The coating is accomplished by dispersing the coating material in a suitable liquid in a slurry. The cores are then coated with the slurry, withdrawn and dried to remove the liquid. The result is a rather loosely held, mechanical coating of non-uniform disoriented particles. These coated cores may be used as chromatographic supports although they suffer from several disadvantages. The coatings are subject to easy removal as by chipping and flaking. Such variables as thickness and uniformity of coating cannot be controlled since, due to surface tension, the coating is thicker at the points of contact between the cores than elsewhere. It would be desirable to have the coated material irreversibly bonded to the core and ideally the bonding process would be such that the coating would be uniform, of predictable thickness, and of predeterminable porosity.

Kirkland (Kirkland, J. J., "Gas Chromatography 1964," A. Goldup, Editor, The Institute of Petroleum, London, W. 1, pp. 285–300, 1965) has described the preparation of a chromatographic support by bonding successive layers of silica microparticles to glass beads by means of very thin fibrillar boehmite films. These coated cores may be employed as chromatographic adsorbants or supports, but suffer from the serious disadvantage of having a chemically inhomogeneous surface. The small but significant amounts of high surface alumina which is present in the porous layer is deleterious for certain types of separations due to the adsorption or reacting properties of the alumina.

Coated glass beads consisting of a single layer of finely divided diatomaceous earth particles bonded to the glass beads with fibrillar boehmite have also been described as a chromatographic support (Kirkland reference as above; Kirkland, J. J. Anal. Chem. 37, 1458–1461, (1965)]. The disadvantage of this material as a chromatographic support is that the surface again is not chemically homogeneous. In addition, it is not possible to prepare such structures with a uniform surface and with a certain predetermined porosity.

A method of depositing colloidal particles of a given size and ionic charge from aqueous dispersion onto the surface of a solid, a single monolayer of particles at a time, and by repeating the process to coat the surface with any desired number of monolayers is described by R. K. Iler in Canadian Patent No. 729,581 issued Mar. 8, 1966, assigned to E. I. du Pont de Nemours & Company, Wilmington, Del., U.S.A. Shown also is a solid-state substrate to a surface of which there is irreversibly joined a coating comprising several monolayers of colloidal particles, the particles in each monolayer being alike and being differerent from the colloidal particles in an adjoining monolayer. This is also described in a copending U.S. patent application, Ser. No. 477,635 filed July 22, 1965 assigned to E. I. du Pont de Nemours & Company.

According to the present invention, a coating of monolayers of colloidal inorganic microparticles in which all of the microparticles are alike, is produced by first forming a coating consisting of alternate layers of colloidal inorganic microparticles and of an organic colloid, and then removing the alternate monolayers of organic matter so as to obtain a residual coating of layers of colloidal inorganic particles in which all the microparticles are alike.

BRIEF DESCRIPTION OF DRAWINGS

FIGURE I is a diagrammatical representation of a partially cut-away cross-section of a coated core which is a typical support particle of this invention. The impervious macroparticle core 11 has a coating of several monolayers of like colloidal microparticles 13, which make up the coating 15. The number of superficial surface pores 17 will be large and uniform due to the regular arrangement of the particles in the outer layer, but in view of the regular oriented arrangement of the particulate monolayers at each depth, the number of deep pores will be negligible.

FIGURE II shows HETP (height equivalent to a theoretical plate) versus average linear carrier gas velocity data obtained with gas chromatographic columns made from unmodified and superficially porous coated glass beads as described in Example I. The plots demonstrate the superiority of the superficially porous beads for gas chromatographic separations.

Figure 1:
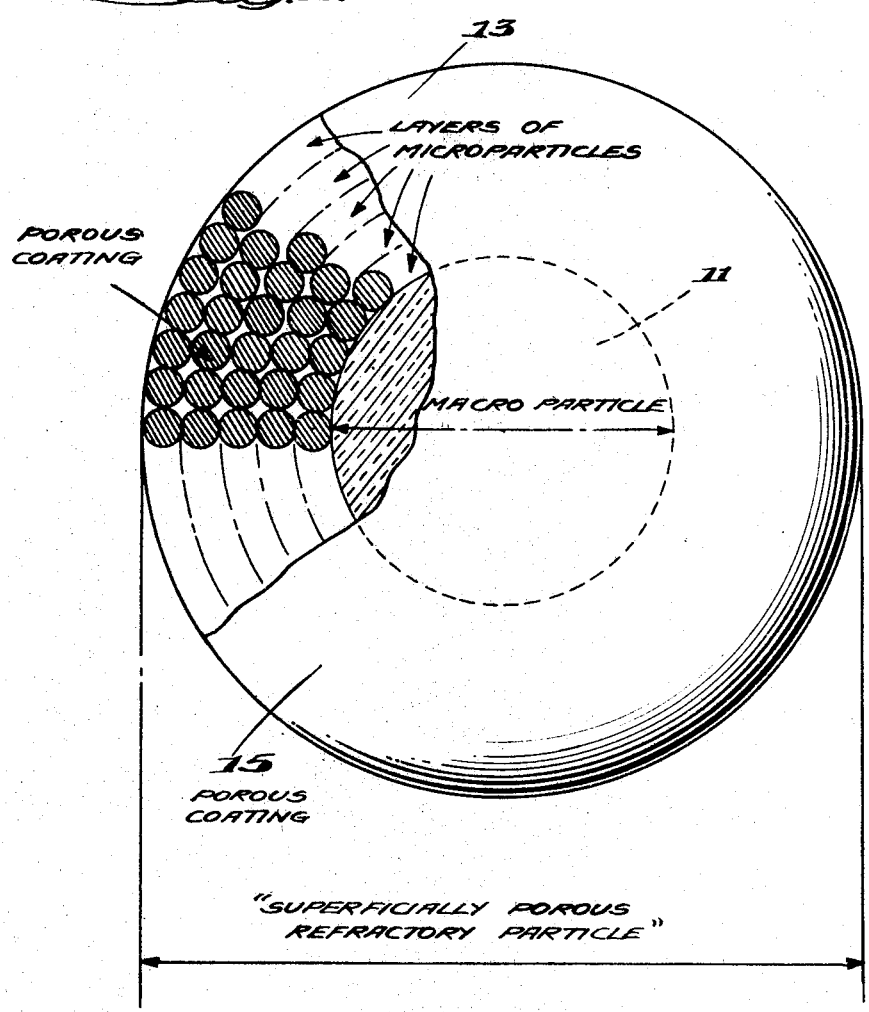
Figure 2:
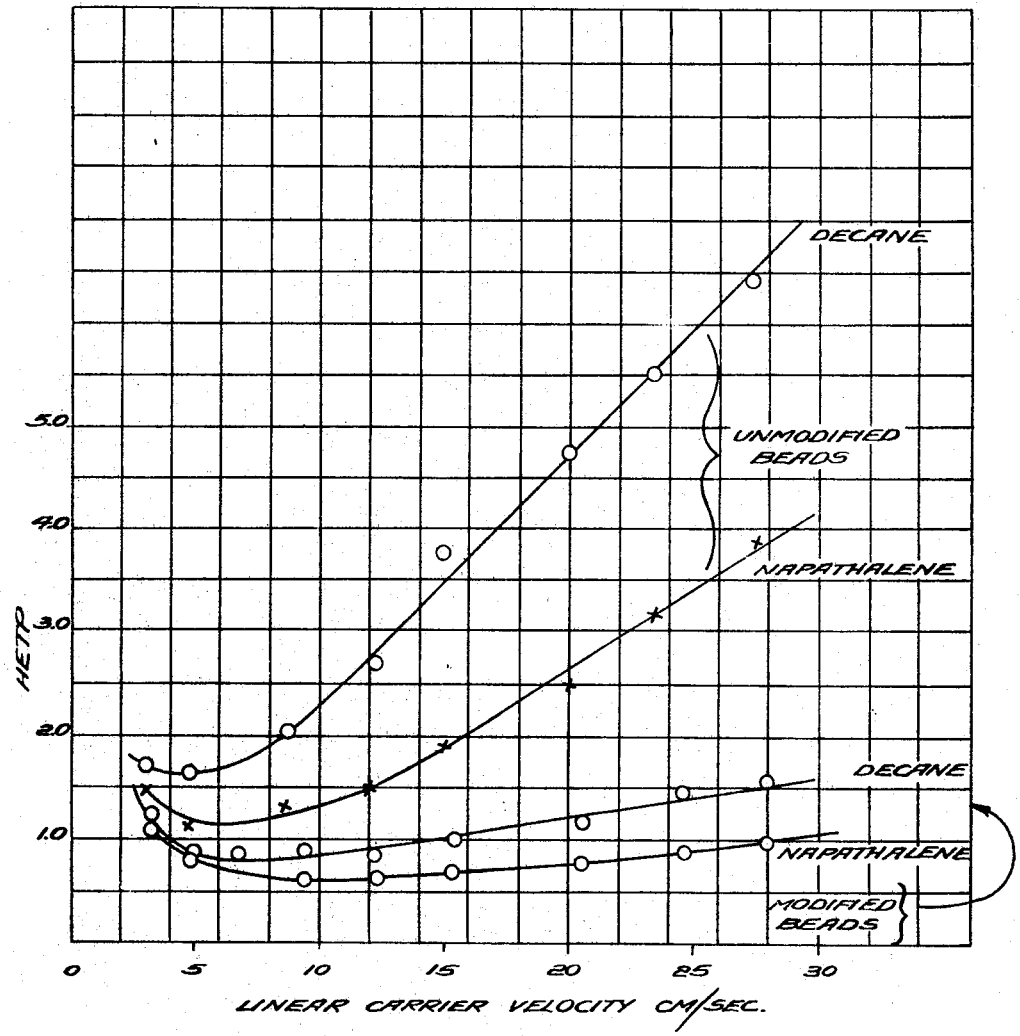
Figure 3:
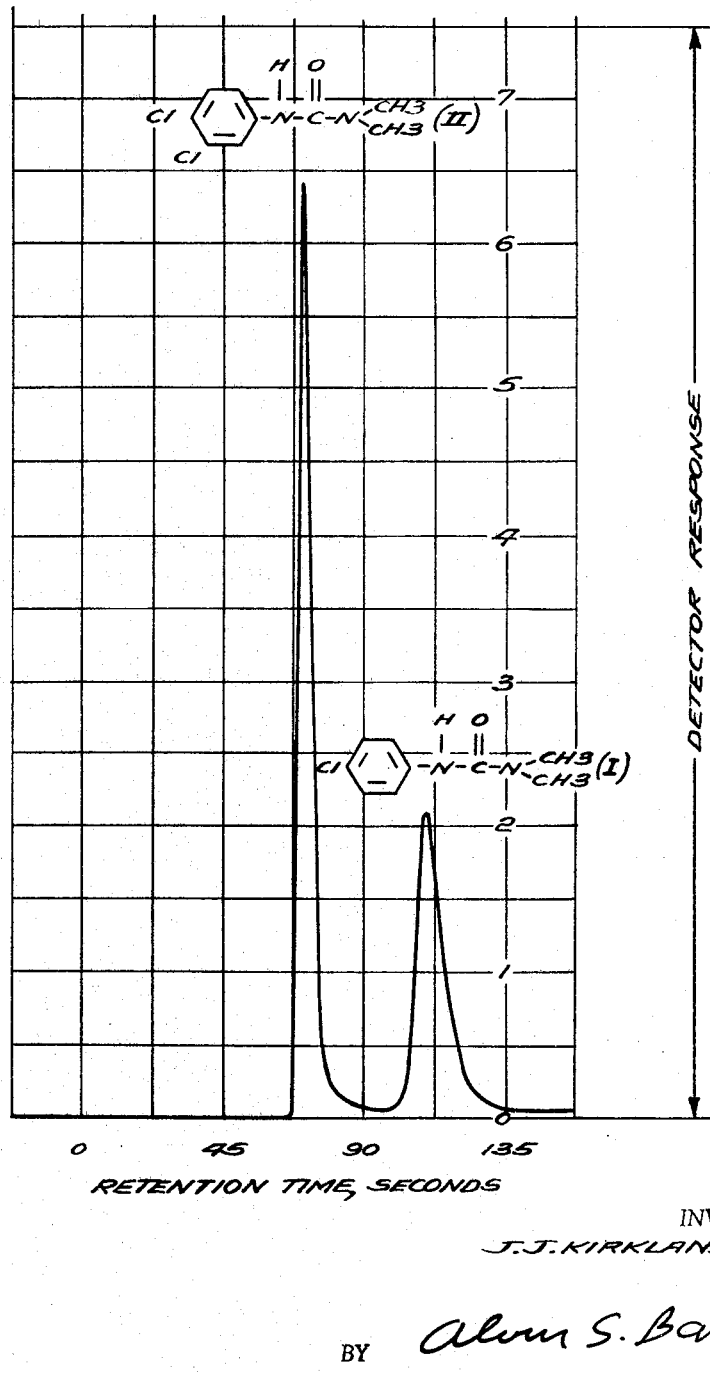

FIGURE III is a reproduction of a high-speed liquid-liquid chromatographic separation of "Monuron" (I)3,p-chlorophenyl-1,1-dimethylurea) and "Diuron" (II)3,4-dichlorophenyl-1,1-dimethylurea) which was accomplished by using a superficially porous coated glass bead support, as described in Example II.

SUMMARY OF THE INVENTION

A novel chromatographic support eliminating many of the prior art difficulties has now been prepared. The prior art difficulties of non-uniformity, lack of pre-determinability of thickness or porosity, and poor adherence of the coating can be reduced or substantially eliminated by utilizing a coating process whereby the coating is uniformly and irreversibly bonded, one monolayer at a time to the macroparticle core.

The chromatographic support for use in the present invention may be produced by the process of Canadian Patent No. 729,581 which consists of coating impermeable macroparticle cores with a series of unlike, oppositely charged, sequentially adsorbed monolayers of like colloidal refractory microparticles. (By like particles, is meant that the particles of any given monolayer are of similar charge, and preferably, although not necessarily, of the same chemical composition.) The coating process causes the coating to be irreversibly joined to the macroparticle by means of electrostatic forces in the nature of a chemical or partial valence bond.

Coating is accomplished by contacting macroparticles bearing a surface charge with a colloidal dispersion of an organic material which has an opposite charge. These colloidal organic particles will be attracted to the oppositely-charged macroparticles and become electrostatically bonded thereto. The surface of the macroparticle will then assume an electrical charge which is now opposite to that which was on the surface originally. The reason for this is that once the colloidal particle sticks to the macroparticle, the surface charges are neutralized so the coated spot no longer appears oppositely charged to the colloidal particles remaining in the dispersion. Therefore, no further colloidal particles will be attracted, and there will be no further build-up of particles at that spot. Excess organic colloid is removed by rinsing, and the coated macroparticle is then immersed in a second colloidal dispersion of inorganic microparticles of charge opposite from those of the organic colloid. Repeating the process by alternating immersions betwen the organic colloid and the inorganic microparticles results in the adsorption of further monolayers in sequence. The interpolated monolayers will be of a different material than those adjacent. One of the layers, called the organic interlayer, will consist of colloidal particles or micelles of an organic material. After a sequential coating of the desired number of monolayers of inorganic microparticles is built up, the interpolated organic interlayer will be volatilized by heating, leaving a series of inorganic monolayers of like microparticles, each particle being like the ones in this particular monolayer and also like those in adjacent monolayers.

THE CORES

Any impervious material suitable for use in chromatography may be used as the cores or macroparticles. By impervious material is meant a material having a surface sufficiently free from pores such that when employed as the substrate in a chromatographic process, the materials passing through the separative or resolving zone will not pass into the body or interior of the core. In general, as a rule-of-thumb, the maximum diameter of pores on the surface of the macroparticle should not be greater than 5% of the diameter of the microparticles to be used as the coating. For most purposes the core should be impervious to nitrogen gas. The shape of the macroparticle cores is not critical, although regularly shaped macroparticles will be preferred because of their uniformity of packing characteristics. Any macroparticle shapes suitable for use in chromatography may be employed such as rings, polyhedra, saddles, platelets, fibers, hollow tubes, rods and cylinders. Spheres are preferred because of their regular and reproducible packing characteristics and ease and convenience of handling.

The composition of the core or macroparticle is not critical except that it should be stable to the conditions necessary to prepare the coating and suitable for use in chromatography. The macroparticles could be, for example, glasses, sands, ceramics, metals or oxides. In addition to truly impervious cores such as these, other types such as aluminosilicate molecular sieve crystals could be used. In general, materials which have some structural rigidity will be preferred. As pointed out, the macroparticle must be capable of acquiring an electrical charge in the presence of the colloidal dispersion medium as this provides the bonding force enabling it to adsorb a monolayer of the microparticles. Most water wettable substrates have negatively charged surfaces.

Glass beads are preferred macroparticles because of their uniformity of surface characteristics and predictability of packing characteristics as well as the ease of obtaining them.

The size of the cores or macroparticles will, in general, not be critical. For spheres and similarly shaped bodies, a size in the range of an average diameter of from 10–500 microns prior to coating will be preferred.

THE COATING

The coating of the finished product to be used as a chromatographic separative material will consist of like monolayers of like inorganic microparticles. By "like microparticles" is understood microparticles which are alike in charge and preferably but not necessarily, in chemical composition. For example, the microparticle may be a mixture of colloidal particles of silica and of colloidal particles of titanium dioxide coated previously with a thin layer of silica. There is no substantial limitation as to the nature or composition of these microparticles except their suitability for use in the chromatographic process. They will be chosen in the light of the eventual applications envisioned with respect to, for example, the nature of the chromatographically active substance, if any, which may be employed in conjunction with them or coated on their surfaces, and the materials which will be chromatographically separated with respect to chemical type, size of molecules, etc. The microparticle coating shall generally have uniformity such that the variation of thickness of the coating from point to point is no more than three times the diameter of the microparticles in the coating. When the microparticles are uniform in size, i.e. are substantially all within 50% of the average diameter, the variation in thickness of the coating is no more than twice the average diameter of the microparticles.

The particles sizes of the coating microparticles will vary greatly depending on the nature of the particles and their eventual chromatographic application. Broadly, particle sizes in the range of from 5 millimicrons to 1 micron may be employed. For convenience of preparing coatings of desired thickness, microparticles in the range of 25–1000 m$\mu$ are preferred. For many purposes, a relatively large pore size in the coating is desired to permit rapid diffusion of components in chromatographic processes. Since the size of the microparticles determines the size of the pores, 100–1000 m$\mu$ particles are preferred in cases where rapid diffusion is needed. The number of layers to be applied will range from two to as many as desired. For practical purposes, 30 layers may be considered a maximum. From two to fifteen layers of like particles are commonly employed.

Compositionwise, the coating microparticles may be any desired substances which can be reduced to a colloidal state of subdivision wherein the microparticles have surfaces bearing ionic charges. They must be dispersible in a medium as a colloidal dispersion. Water is the best medium for dispersions of particles bearing ionic charges. Examples of aqueous sols are amorphous silica, iron oxide, alumina, thoria, titania, zirconia, and aluminosilicates including colloidal clays, such as montmorillonite, colloidal kaolin, attapulgite, and hectorite. Silica is the preferred material because of its low order of chemical activity, its ready dispersibility, and the easy availability of aqueous sols of various concentrations. The surface of the superficially porous refractory particles to be used in chromatographic columns may be further modified by various treatments, such as reaction with alcohols or metal oxides, depending on the type of chromatographic separation which is required.

Before elimination of the organic interlayer, the colloidal particles in any particular monolayer are like each other but are different from the particles in an adjacent monolayer. The alikeness of particles in each monolayer has reference mainly to their surface characteristics and especially their surface electrical charge. Ordinaily they would be alike in chemical composition and similar in size and shape. In a preferred aspect, this size and shape will be substantially uniform.

THE ORGANIC INTERLAYERS

As previously discussed, the coating procedure requires the insertion of alternate layers of colloidal organic particles of opposite charge between the layers of inorganic microparticles as an important part of the sequential coating process. The interpolated layers provide the fresh, oppositely charged surfaces necessary for the attraction and holding of the inorganic microparticles.

The composition of the organic interlayers is not critical. As examples thereof are negatively or positively charged water-soluble gums, natural latices, artificial latices, proteins, synthetic polymers, and synthetic condensation products may be employed if suitably dispersible. Organic surfactants which form micelles in aqueous solution, may be employed since the micelles act as colloidal particles.

Specific materials will be chosen with respect to the nature of the inorganic coating in order to provide the necessary opposite charge. Preferred materials are poly-(diethylaminoethylmethacrylate) acetate (poly-DEAM) or poly-$\beta$-methacrylyloxyethyldiethylmethyl ammonium methyl sulfate (poly-$\beta$-MEMAMS), and polymethacrylic acid. The former materials are examples of positively charged species, and the latter is a material which will easily acquire a negative charge.

DEPOSITING THE COATING

The coating is deposited with no great difficulty as described. The cleaned macroparticle cores are immersed in a colloidal dispersion of microparticles. The first coating can be the organic or inorganic particles depending on the electrical charges of the colloids. Usually the organic coating will be first applied as a binder or interlayer between the macroparticle core surface and the refractory microparticles. After depositing a monolayer of the organic interlayer, the coated macroparticle is rinsed with a liquid which will rinse off any particles not directly adsorbed to the surface of the macroparticle. Water is commonly employed. The treated, rinsed macroparticle is then immersed in a colloidal dispersion of the inorganic refractory microparticles which are to form the permanent coating. The double-coated particle is now rinsed again and the process sequentially repeated. When the desired thickness has been built up, the coatings may be permanentized by heating. Heating will be done at a high enough temperature so as to decompose, volatilize, or oxidize the organic interlayer, or alternatively, the particles may just be dried and the organic interlayer removed by chemical means such as by oxidation. However, for most chromatographic applications, the organic interlayers would be substantially removed by volatilization which usually will involve thermal decomposition or oxidation.

The foregoing is a brief sketch of the coating process. The entire procedure with particulars, details and alternatives may be found in Canadian Patent No. 729,581 to Iler, which corresponds substantially to co-pending U.S. application, Ser. No. 477,635. The Canadian patent should be consulted for details of the coating process.

Prior to use in chromatography, it will sometimes be considered desirable to modify or establish the chromatographic properties of these superficially porous chromatographic supports by treating them with a sorptively active liquid phase. Typical examples of commonly employed sorbents in chromatography are polyethylene glycol, squalane silicone oil, and others. This coating procedure and the subsequent preparation of suitable chromatographic columns will then be carried out using methods also well known to the art, as shown, for example in, "Gas-Liquid Chromatography, S. Dal Nogare, R. S. Juvet Jr., Interscience Publishers, New York, 1962."

PRODUCT

The finished product ready to be used in the preparation of chromatographic apparatus, especially columns, comprises superficially porous refractory particles. In general, where the core material is in the shape of spheres or similar shapes, the total diameter of the particles will be from 5–500 microns overall. The coating on such a shaped particle will be a series of monolayers of inorganic microparticles and will represent, in general, from 0.002 to 25% by volume of the total volume of the superficially porous coated particles.

In a preferred embodiment of the invention, spherical glass beads of 10–250 microns in diameter will be coated with silica microparticles having an average particle size of 0.01–1 micron. The organic interlayers will be poly-BEAM or poly-$\beta$-MEMAMS, and will be removed by heating, leaving a superficially porous coating representing from 0.01–3% by volume of the total, and will contain pores of from 0.1 to 1.0 times the diameter of the microparticles.

The following examples are given by way of illustration:

EXAMPLE I

Two hundred ten grams of 60–80 mesh soda-lime-silica glass beads are soaked for about two hours in a 0.5% solution of "Lakeseal" laboratory glass cleaner, and the clean beads washed thoroughly with water. The wet beads are then placed in a tube which may consist of a length of two-inch O.D. glass pipe fitted at the top and bottom with fine stainless steel screens. Excess water is removed from the beads by placing a vacuum on the bottom of the tube. One hundred twenty-five ml. of a 0.5% colloidal dispersion of poly-DEAM is poured on the beads in the tube, the mixture stirred, and allowed to stand for five minutes. Excess poly-DEAM is removed by upflow washing of the bed with water. The beads are then dried by forcing air through the bed. Eighty milliliters of a 10% dispersion of 200 millimicron silica sol (pH 3.6) is added to the bead bed, the mixture stirred, and allowed to stand for 15 minutes. Excess silica sol is then removed by placing a vacuum on the bottom of the tube. The bed is washed free of excess silica sol by an upflow of water until the wash is clear. The beads are air-dried by placing a vacuum on the bottom of the tube.

The poly-DEAM silica sol treatment is repeated three additional times to build successive layers of silica particles on the surface of the beads. Surface areas determined by the nitrogen flow procedure on samples taken after each treatment, then dried at 150° C. under vacuum for 16 hours, are shown below:

Treatment:

|  | Surface area, m.²/g. |
|---|---|
| Clean beads | 0.01 |
| First coating | 0.05 |
| Second coating | 0.24 |
| Third coating | 0.32 |
| Fourth coating | 0.51 |

The coating on the four-times-treated beads is regular, with a thickness normally varying between 0.5 and 1 micron. To improve the mechanical strength of the coated beads, the beads are heated at 725° C. for one hour. The surface area of this product is 0.13 m.²/g.

The gas chromatographic column packing is prepared by dissolving 0.075 g. of Dow Corning 200 silicone oil, a poly-dimethyl siloxane, in dichloromethane, mixing it with 30 g. of the coated beads, and removing the solvent by gently stirring the mixture over a steam bath. The packing is dried in a vacuum oven for about one hour at 100° C. and a one-meter long, ¼ O.D. x 3/16" I.D. stainless steel tubing packed with this material using conventional vibration techniques. The column is conditioned at 225° C. for at least one hour with carrier gas flow before use. A control column was similarly prepared and packed with unmodified beads.

FIGURE II demonstrates the performance of a silica-modified bead column prepared in the manner described above in comparison with an unmodified bead packed column. This figure shows HETP (height equivalent to a theoretical plate) versus linear gas velocity plots for unmodified and silica-modified glass beads. The gas chromatographic packing was prepared by coating the superficially porous glass beads with 0.25% Dow Corning 200 silicone oil. Two different solutes were used to obtain the basic performance data on this column, decane being a rapidly eluted compound, and naphthalene being a compound of relatively long retention time.

This type of plot is a well recognized means of displaying the performance of gas chromatographic columns. This data shows that the superficially porous support is clearly superior to unmodified glass beads, permitting significantly lower HETP's (indicating high column efficiency) at much higher carrier gas velocities. The end result of using the superficially porous coated beads is that separations can be performed faster with higher efficiency.

EXAMPLE II

A stainless steel tubing five meters long and 1.4 mm. I.D. is filled with a packing consisting of the silica-modified beads described in Example I which are coated with 0.50% β,β'-oxydipropionitrile. The liquid coating and column filling procedures are carried out in the manner described in Example I. This packed column is then equilibrated with dibutyl ether carrier phase. One-half microliter of a mixture of 0.5 mg./ml. solution of each of 3-(p-chlorophenyl)-1,-dimethylurea (I) and 3-(3,4-dichlorophenyl)-1,1-dimethylurea (II) in dibutyl ether is injected onto the top of the column with an input pressure of 550 lbs. p.s.i. and a carrier flow rate of 192 ml./hr. FIGURE III shows the chromatogram which is obtained under these conditions using a continuous detector consisting of an ultraviolet photometer operating at 254 millimicrons with a full scale sensitivity of 0.1 absorbance units. It will be noted that the complete separation of these closely similar compounds was carried out in about 135 seconds.

EXAMPLES III THROUGH X

The procedure of Example I was followed substituting for those materials, the materials shown in Table I as the cores, organic interlayer, and inorganic microparticles in the superficially porous chromatographic support preparation.

Chromatographic colums packed with the materials shown above show good separative properties. For instance, the material in Examples II and IV coated with thin films of polyethylene glycol (molecular weight 200–400) are useful for separating wide varieties of organic materials by liquid-gas chromatography and liquid-liquid chromatography. The materials from Examples V, VI, VII, VIII, and X exhibit the ability to separate compounds by gas-solid chromatography. Preparations from Examples VI, VIII, and X are useful materials for carrying out chromatographic analyses by liquid-solid chromatography. The material in Example XI is capable of separating macromolecules, either naturally-occurring or synthetic by means of a diffusion-sizing operation somewhat analogous to gel filtration and gel permeation chromatographic separations which are practiced with certain organic gels. This diffusion-sizing operation is possible because of the regular and predictable porosity of the superficially porous coating.

The foregoing examples are given by way of illustration and not limitation of the invention. It will be understood that various minor modifications may be made as will readily occur to one skilled in the art without departing from the spirit and scope of the invention.

| Example No. | A macroparticle | B microparticle | Aqueous mixtures of organic interlayer | Sizes A | Sizes B | No. of layers |
|---|---|---|---|---|---|---|
| 3 | Sand | Diatomaceous earth | 0.5% ploy-DEAM | 175–200μ | 100–300mμ | 3 |
| 4 | Stainless steel capillary tube | Silica | 0.1% bovine serum albumin, PH-3 | 25μ id | 25 mμ | 4 |
| 5 | Alpha alumina crystals | Boehmite | 1% linear polymethacrylic acid | 5–10μ | 5 mμ | 5 |
| 6 | Diatomaceous earth granules | Aluminosilicate (molecular sieve) | 0.5% "Reten"-205 cationic polymer | 149–177μ | 1μ | 3 |
| 7 | Alumina berls | Zirconia | 3% "Dow polystyrene latex" | 1 mm | 25mμ | 6 |
| 8 | Aluminosilicate (molecular sieve granules) | Silica | 0.5% poly-β-MEMAMS | 177–250μ | 50mμ | 8 |
| 9 | Glass beads | do | 0.5% poly-DEAM | 74–88μ | 11mμ | 5 |
| 10 | Glass wool | Kaolin | 0.2% bovine serum albimun, PH-3 | Fiber | 25mμ | 3 |

What is claimed is:

1. An apparatus for use in chromatographic separations comprising a resolving zone through which materials to be separated are passed, said resolving zone comprising a plurality of superficially porous refractory macroparticles, each of said macroparticles having an impervious core and a coating of a multiplicity of like monolayers of like colloidal inorganic microparticles irreversibly joined to and surrounding said core, each of said monolayers comprising a layer having a thickness of one microparticle, and means for determining the extent of retention of at least one of said materials by said macroparticles.

2. An apparatus as described in claim 1 wherein said macroparticles have an average diameter of from 5–500 microns, said microparticles have an average diameter of from 0.005–1 micron and constitute from 0.002 to 25% of the total volume of said macroparticles.

3. An apparatus as described in claim 2 wherein said superficially porous refractory macroparticles are coated with a sorptively active material.

4. An apparatus as described in claim 3 wherein said apparatus is a column, said impervious cores being glass beads, said colloidal inorganic microparticles consisting essentially of silica.

5. An improved process for performing chromatographic separations comprising,
contacting the materials to be separated in a carrier phase with a plurality of superficially porous refractory macroparticles, each of said macroparticles having an impervious core and a coating of a multiplicity of like monolayers of like colloidal inorganic microparticles irreversibly joined to and surrounding said core, each of said monolayers comprising a layer having a thickness of one microparticle, and determining the extent of retention of at least one of said materials by said macroparticles.

6. The process of claim 5 wherein said macroparticles have an average diameter of from 5–500 microns, said microparticles have an average diameter of from 0.005–1 micron and constitute from 0.002–25% of the total volume of said macroparticles.

7. The process of claim 6 wherein said superficially porous refractory macroparticles are coated with a sorptively active material.

8. The process of claim 7 wherein said colloidal inorganic microparticles consist essentially of silica, said impervious cores being glass beads.

References Cited

UNITED STATES PATENTS 3,340,085  9/1967  Halasz et al. _____ 55—386 X

FOREIGN PATENTS 729,581  3/1966  Canada.
1,016,635  1/1966  Great Britain.

OTHER REFERENCES

Kirkland, J. J., "Some modified gas chromatographic Adsorbents and Supports," Gas Chromatography 1964. The Institute of Petroleum—London, pp. 285–300.

JAMES L. DECESARE, Primary Examiner